US008084656B2

(12) United States Patent
Feldmann

(10) Patent No.: US 8,084,656 B2
(45) Date of Patent: Dec. 27, 2011

(54) SYSTEMS AND METHODS FOR OXIDATION OF SYNTHESIS GAS TAR

(75) Inventor: Herman Feldmann, Carbondale, IL (US)

(73) Assignee: Rentech, Inc., Los Angeles, CA (US)

( * ) Notice: Subject to any disclaimer, the term of this patent is extended or adjusted under 35 U.S.C. 154(b) by 652 days.

(21) Appl. No.: 12/248,333

(22) Filed: Oct. 9, 2008

(65) Prior Publication Data
US 2009/0090053 A1 Apr. 9, 2009

Related U.S. Application Data

(60) Provisional application No. 60/978,593, filed on Oct. 9, 2007.

(51) Int. Cl.
*C10G 1/00* (2006.01)
*C10J 3/00* (2006.01)

(52) U.S. Cl. ............. 585/242; 585/240; 48/209; 48/89; 48/111; 48/197 R; 422/145; 422/146

(58) Field of Classification Search .................. 585/240, 585/242; 48/209, 89, 111, 127.3; 422/145, 422/146
See application file for complete search history.

(56) References Cited

U.S. PATENT DOCUMENTS

| 4,828,581 A * | 5/1989 | Feldmann et al. .......... 48/197 R |
| 5,494,653 A * | 2/1996 | Paisley ........................ 423/652 |
| 6,613,111 B2 * | 9/2003 | Paisley ........................... 48/89 |
| 6,680,137 B2 * | 1/2004 | Paisley .......................... 429/426 |
| 6,808,543 B2 * | 10/2004 | Paisley ........................ 48/197 R |
| 7,736,402 B2 * | 6/2010 | Crorey, Jr. .................. 48/197 R |
| 7,763,088 B2 * | 7/2010 | Feldmann ....................... 48/209 |
| 7,875,090 B2 * | 1/2011 | Dietenberger et al. ..... 48/197 R |
| 2005/0261382 A1 | 11/2005 | Keyser et al. |

FOREIGN PATENT DOCUMENTS

| GB | 1528368 A | 10/1978 |
| JP | 11-021566 | 1/1999 |
| JP | 2003-049177 | 2/2003 |
| KR | 10-2006-0012934 | 2/2006 |

OTHER PUBLICATIONS

Korean International Search Report for PCT Application No. PCT/US2008/079372 dated Feb. 27, 2009.
Supplementary European Search Report dated Sep. 26, 2011 for corresponding EP Application No. 08838160.3 (9 pgs.).

* cited by examiner

*Primary Examiner* — Nina Bhat
(74) *Attorney, Agent, or Firm* — Porter Hedges, LLP; Timothy S. Westby

(57) ABSTRACT

The various embodiments of the present invention relate generally to the process of gasification and the production of synthesis gas. More particularly, the various embodiments of the present disclosure relate to the process of biomass gasification and the reduction or elimination of tars from the hydrocarbon-rich product gas derived from biomass gasification. The present invention comprises systems and methods for the reduction of tar from a synthesis gas derived from biomass gasification.

15 Claims, 1 Drawing Sheet

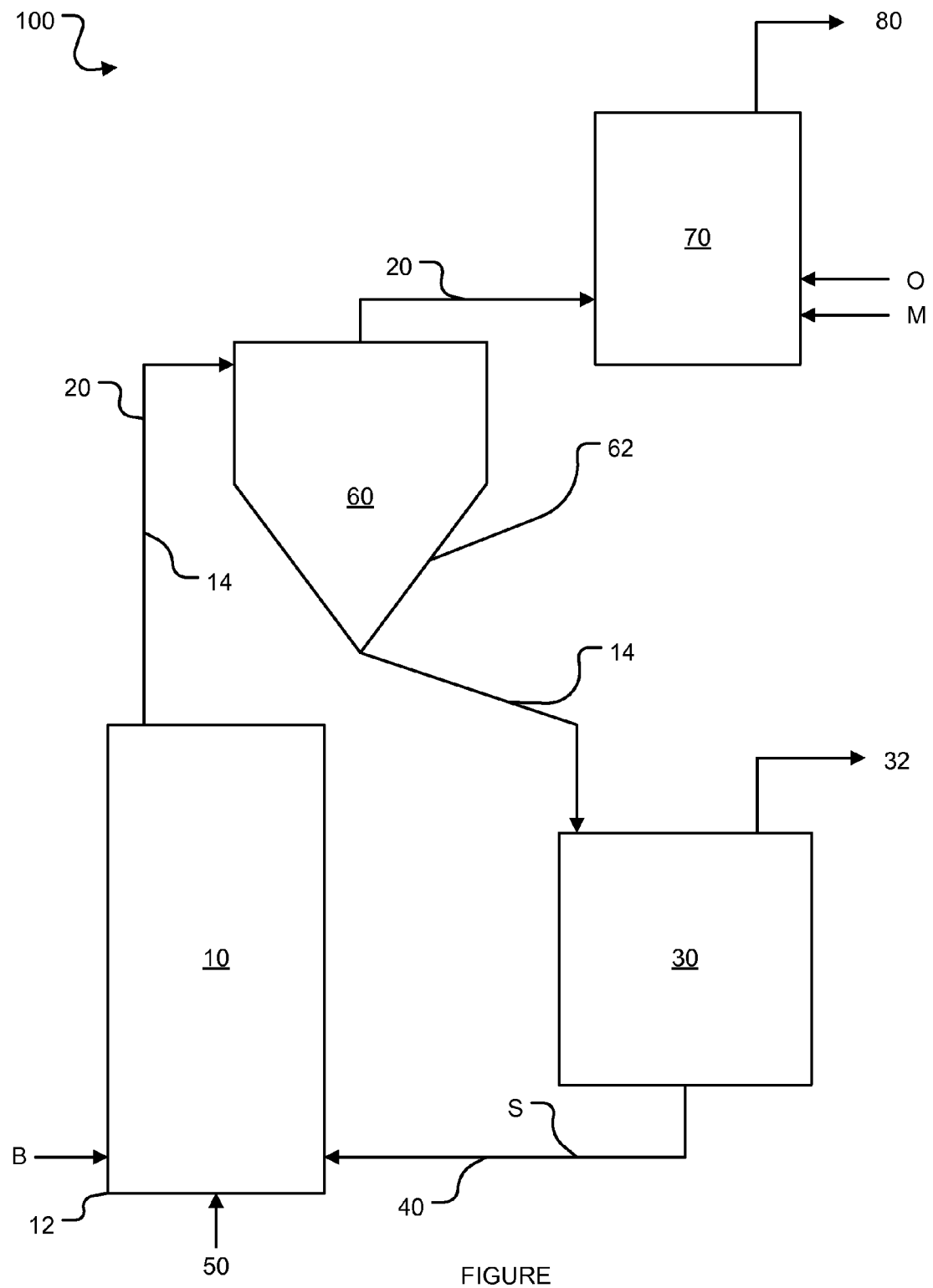
FIGURE

SYSTEMS AND METHODS FOR OXIDATION OF SYNTHESIS GAS TAR

RELATED APPLICATIONS

This application claims, under 35 U.S.C. §119(e), the benefit of U.S. Provisional Application Ser. No. 60/978,593, filed 9 Oct. 2007, the entire contents and substance of which are hereby incorporated by reference as if fully set forth below.

TECHNICAL FIELD OF THE INVENTION

The various embodiments of the present invention relate generally to the process of gasification and the production of synthesis gas. More particularly, the various embodiments of the present invention relate to the process of biomass gasification and the oxidation of tar from the hydrocarbon-rich product gas derived from biomass gasification.

BACKGROUND OF THE INVENTION

Gasification is a process by which either a solid or liquid carbonaceous material (e.g., biomass, coal, petroleum), containing mostly chemically bound carbon, hydrogen, and oxygen, and a variety of inorganic and organic constituents, is reacted with air, oxygen, and/or steam. Sufficient energy is provided to produce a primary gaseous product comprising mostly of $CO$, $H_2$, $CO_2$, $H_2O(g)$, and light hydrocarbons laced with volatile and condensable organic and inorganic compounds (e.g., tars). When gasified with steam and/or oxygen, biomass will produce a product gas, sometimes referred to as "synthesis gas" or "syngas" that is rich in CO and $H_2$. Synthesis gas can then be catalytically converted to produce high-value fuels and chemicals.

Unless the raw product gas is combusted immediately following production, it is generally cooled, filtered, and scrubbed with water or a process-derived liquid to remove condensables and any carry-over particles. Alternatively, the raw gas can undergo either medium-temperature (350° C. to 400° C.) or high-temperature (up to gasifier exit temperatures) gas cleaning to provide a fuel gas that can be used in a variety of energy conversion devices, including internal combustion engines, gas turbines, and fuel cells.

A major barrier to the energy efficient and environmentally benign utilization of biomass by gasification is the "clean-up" of the product gas. Unless the gas can be used hot, for example in an adjacent boiler, removal of condensable tars from the product gas is usually necessary. For example, one of the most efficient and cleanest ways to use biomass to generate power to date is to use the product gas in a gas combustion turbine; however, this application requires that essentially all condensable tars are removed from the product gas. Another promising application of a product gas derived from biomass gasification is for the synthesis of a wide variety of liquid fuels, including ethanol and higher alcohols. Similar to the gas turbine applications, the synthesis of alcohols from a biomass gasification product gas also demands the removal of tars and, if possible, even non-condensable hydrocarbons from the product gas.

Several approaches have been tested for the removal of tar from the product gas of biomass gasification, such as catalytic and non-catalytic cracking of tar, dry scrubbing with activated carbon and filters, wet scrubbing, steam reformation of tar, and partial oxidation of biomass directly to produce synthesis gas. However, according to a study published by the National Renewable Energy Laboratory, currently available technologies for tar removal do not meet the needs of the industry in terms of cost, performance, and environmental considerations (T. A. Milne, et al., Biomass Gasification Tars, Their Nature, Formation, and Conversion, NREL/TP 570-25357, November 1998).

Accordingly, there is a need for systems and methods for the reduction in the level of tar or destruction of tar from synthesis gas. It is to the provision of such systems and methods for the reduction in the level of tar or destruction of tar from synthesis gas that the various embodiments of the present invention are primarily directed.

BRIEF SUMMARY OF THE INVENTION

Various embodiments of the present invention relate generally to the process of gasification and the production of synthesis gas. More particularly, the various embodiments of the present disclosure relate to the process of biomass gasification and the reduction or elimination of tars from the hydrocarbon-rich product gas derived from biomass gasification. Briefly described, the present invention relates to methods and systems for removing tars from hydrocarbon-rich gases (e.g., without limitation, product gases from biomass gasification) as well as producing synthesis gases with improved properties.

An aspect of the present invention comprises a biomass gasification system comprising: a combustor for heating a fluidized particulate material; a gasifier to heat a biomass feedstock with the heated fluidized particulate material to produce a product gas comprising a tar; and a reactor to react an oxygen-containing gas with the product gas comprising a tar to at least partially oxidize the tar to produced an oxidized product gas. In an embodiment of the present invention, at least a portion of the biomass feedstock is converted to char in the gasifier and the char is transferred out of the gasifier. In another embodiment of the present invention, at least a portion of the char is transferred to the combustor and combusted to heat the fluidized particulate material. An aspect of the biomass gasification system comprises a rate of heat transfer between the heated fluidized particulate material and the biomass feedstock sufficient to convert at least about 70% of the carbon in the biomass feedstock into the product gas at a temperature of about 1200° F. to about 1500° F. In an embodiment of the present invention, the product gas cooled prior to introduction into the reactor.

In embodiment of the present invention, the oxygen-containing gas is substantially pure oxygen. In some embodiments of the present invention, the reactor utilizes a fluidized medium to optimize the oxidation of the tar, such as one or more of calcined dolomite, limestone, olivine sand, and a calcium-containing material. In an exemplary embodiment of the present invention, the oxidized product gas has a $H_2/CO$ ratio that is at least twice as large as the $H_2/CO$ ratio of the product gas comprising a tar.

An aspect of the present invention comprises a method for removing tar from a gas comprising: introducing a first gas into a reactor, the first gas comprising tar; introducing a second gas into the reactor, the second gas comprising oxygen; reacting the first gas with the second gas for time period sufficient to oxidize at least a portion of the tar of the first gas; and producing an at least partially oxidized product gas that has less tar than the first gas comprising a tar. In an embodiment of the present invention, the first gas is a synthesis gas, and the second gas is substantially pure oxygen. In an exemplary embodiment of the present invention, the oxidized product gas has a $H_2/CO$ ratio that is at least twice as large as the $H_2/CO$ ratio of the product gas comprising a tar. In an embodiment of the present invention, the method for removing a tar from a gas can further comprise providing a fluidized medium to the reactor.

An aspect of the present invention comprises a biomass gasification method, comprising: heating a fluidized particulate material in a combustor; transferring the heated fluidized particulate material to a gasifier; introducing a biomass feedstock to the gasifier, wherein heat from the fluidized particulate material causes the gasification of at least a portion of the biomass feedstock to form a tar-containing product gas; and introducing the tar-containing product gas and an oxygen-containing gas into a reactor, wherein the oxygen-containing gas reacts with the tar to oxidize at least a portion of the tar of the tar-containing gas to produce an at least partially oxidized product gas comprising less tar than the tar-containing product gas. In one embodiment of the present invention, at least a portion of the biomass feedstock is converted to char in the gasifier, and the char is transferred out of the gasifier. In an embodiment of the present invention, the oxygen-containing gas is substantially pure oxygen. In an exemplary embodiment of the present invention, the oxidized product gas has a $H_2/CO$ ratio that is at least twice as large as the $H_2/CO$ ratio of the product gas comprising a tar.

In an embodiment of the present invention, the biomass gasification method can further comprise introducing a fluidized medium into the reactor. In another embodiment of the present invention, the biomass gasification method can further comprise cooling the tar-containing product gas before introducing the product gas into the reactor Other aspects and features of embodiments of the present invention will become apparent to those of ordinary skill in the art, upon reviewing the following description of specific, exemplary embodiments of the present invention. It should be understood, however, that the detailed description and the specific examples, while indicating the exemplary embodiments of the present invention, are given by way of illustration only, since various changes and modifications within the spirit and scope of the present invention will become apparent to those skilled in the art from this detailed description. These and other objects, features and advantages of the present invention will become more apparent upon reading the following specification.

BRIEF DESCRIPTION OF THE DRAWINGS

The FIGURE is a schematic of a biomass gasification system.

DETAILED DESCRIPTION

In an attempt to provide a superior biomass gasification process, the various embodiments of the present invention permit the conversion of a range of solid biomass fuels into a medium calorific value gas that can be directly substituted for natural gas or as an input for chemical synthesis applications. For gas turbine power applications, the use of biomass fuels derived from the systems and methods of the present invention provide a means to achieve high overall power generation efficiencies without introducing additional greenhouse gases to the environment. By converting the biomass into this high energy density gaseous fuel, significantly higher power generation efficiencies are achieved relative to direct combustion based systems (approximately 40% power generation efficiency compared to a maximum of 25% with conventional biomass systems).

As used herein, the term "biomass" refers to many carbonaceous biological materials, including but not limited to, plant matter, shredded bark, wood chips, sawdust, sludges, peat, agricultural wastes and residues, animal matter, biodegradable wastes, or combinations thereof. Cellulosic-type feed materials, which include agricultural residues, dewatered sewage sludge, municipal solid waste (predominantly paper), and fuels derived from municipal solid wastes by shredding and various classification techniques can be used in the systems and methods of the present invention. Also, peat is an acceptable feedstock because of its high reactivity, as are lignitic coals.

Unlike other biomass gasification processes, the biomass gasification systems and methods of the present invention are not based on starved air combustion, but rather are based on rapidly heating raw biomass in an air-free environment to generate gas and a solid residue char that is used as a heat source for the biomass heating. Significantly fewer emissions are produced in the process because the absence of oxygen in the gasifier makes it impossible to form dioxins if a chlorine containing feed, such as processed municipal solid waster or recycled paper pulp sludges, is used. In addition, cleaning the high-energy density, medium-heating value gaseous product is simplified because the gasifier product gas is much lower in volume than the gas from an "air blown" gasifier.

The systems and methods of the present invention are designed to take advantage of the unique properties of biomass, such as high reactivity, low ash, low sulfur, and high volatile matter. The reactivity of biomass is such that throughputs in excess of 14,600 $kg/hr\text{-}m^2$ (3000 $lb/hr\text{-}ft^2$) are achieved. In other gasification systems, the throughput is generally limited to less than 500 $kg/hr\text{-}m^2$ (100 $lb/hr\text{-}ft^2$).

In an exemplary embodiment of the present invention, biomass is indirectly heated using a hot sand stream to produce a medium calorific value gas (approximately 17 to 19 $KJ/Nm^3$). The process uses two circulating fluidized bed reactors as the primary process vessels. One circulating fluidized bed is the gasifier in which the biomass is heated and pyrolyzed to produce a product gas that conveys the sand and residual char from gasification out of the gasifier. After separation of the sand and char from the product gas, the sand and char flow into the circulating fluidized bed process combustor where the char is combusted to reheat the sand for return to the combustor.

Referring now to the FIGURE, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented.

An aspect of the present invention comprises a biomass gasification system comprising: a combustor for heating a fluidized particulate material; a gasifier to receive a biomass feedstock and the heated fluidized particulate material, wherein the heated fluidized material heats the biomass feedstock to produce a product gas comprising a tar; and a reactor to receive an oxygen-containing gas and the product gas comprising a tar, wherein the oxygen-containing gas reacts with the product gas to at least partially oxidize the tar.

As used herein, the term "tar" includes, without limitation, a gaseous tar, a liquid tar, a solid tar, a tar-forming substances, or mixtures thereof, which generally comprise hydrocarbons and derivatives thereof. Embodiments of the present invention generally relate to systems and methods for reducing or eliminating tars from hydrocarbon-rich gases (e.g., product gases from biomass gasification processes), and for synthesis gas production. These simple, cost-effective, and environmentally friendly methods and systems offer a variety of desirable features, including, without limitation, lower oxygen consumption, improved recovery of heat, improved $H_2$/CO ratio, elimination or simplification down-stream water treatment processes, and/or improved scale-up ability The FIGURE illustrates a system 100 comprising a biomass gasification system. As shown in the FIGURE, a gasifier 10 is provided, in which the biomass B is gasified to produce a product gas 20 that can be substitutable for natural gas. A combustor 30 is provided, in which the char remaining after gasification is burned to provide the heat for gasification.

Heat is transferred between the two vessels 10 and 30 via a stream 40 of fluidized particulate material (e.g., sand S) that circulates between the gasifier 10 and the combustor 30. The biomass B can be fed into the base 12 of the gasifier 10, where it mixes with the hot sand S at the base of the gasifier 10. The sand S at the base of the gasifier 10 is fluidized by the injection of a stream 50 of sufficient steam or other gas.

In an embodiment of the present invention, the rate of heat transfer between the heated fluidized particulate material S and the biomass feedstock B is sufficient to convert at least about 70% of the carbon in the biomass feedstock B into the product gas 20 at a temperature lower than about 1300° F.

In an exemplary embodiment of the present invention, the inside diameter of the gasifier 10 is at least about 36 inches. In an exemplary embodiment of the present invention, the height of the gasifier 10 is at least about 40 feet.

The fluidized bed provides for very rapid heat transfer between the ambient temperature biomass B and the hot sand S. The biomass B gasifies in this zone, and the product gas 20 generated entrains both the gasifying biomass B and the sand heat carrier out of the gasifier 10. The char/sand mixture 14 can be separated from the product gas 20 by means of a cyclone separator 60. The char/sand mixture 14 then flows from a cyclone 62 down into the base of the combustor 30, where the char is burned to reheat the sand S.

The combustor 30 can be a so called "fast fluid bed," which operates entrained. The char is burned, and the sand/ash mixture is separated from a combustion gas above the combustor 30 by cyclone separators. The heated sand S, being much coarser and denser than the ash, is selectively removed in a first stage of separation. The hot sand S separated from the flue gas 32 is then returned to the base of the gasifier 10 to complete the cycle. Burning the residual biomass char in a separate vessel prevents dilution of the product gas 20 with combustion gases, and thereby allows it to have a higher heating value as well as one that is constant regardless of the moisture content of the wood.

A reactor 70 receives the tar-containing product gas 20 and an oxygen-containing gas O, wherein the oxygen-containing gas O reacts with the tar-containing product gas 20 to at least partially oxidize the tar. The oxygen-containing gas O can be many gases with a sufficient oxygen content effective for the sufficient oxidation of tar. For example, the oxygen-containing gas O can be substantially pure oxygen (e.g., commercially pure grade oxygen), or air, among others. The oxygen-containing gas O can comprise other components, such as nitrogen, gaseous water, or combinations thereof, among others, as long as these other components do not substantially interfere with the oxidation reactions. The oxidation of the product gas 20 yields a product gas having a reduced amount of tar 80 as compared to the input product gas 20.

The reactor 70 can further comprise a variety of media M known in the art as a solid circulating or fluidized phase of the circulating fluidized bed. In various embodiments of the present invention, the solid circulating or fluidized phase media M may be selected to optimize performance of the oxidation reactor (e.g., improving the efficiency of the reaction and/or reducing the level of contaminants (e.g., sulfur) in the gases). For example, various solids, including but not limited to, calcined dolomite, limestone, olivine sand, or combinations thereof, are known to have high tar cracking activities and may be used as the solid fluidized phase in the systems and methods of the present invention. In another example, calcium-containing materials may be used to facilitate the scavenging of sulfur in the gases.

The reactor of the present invention can be used in many gasification systems, including but not limited to, the biomass gasification systems disclosed in U.S. Pat. No. 6,680,137 or U.S. Patent Publication No. 2008/0022592, which are hereby incorporated by reference in their entirety.

An aspect of the present invention comprises a method for reducing the amount of tar in a hydrocarbon-rich gas. In an embodiment of the present invention, the method comprises introducing a tar-containing hydrocarbon-rich gas into a reactor, introducing an oxygen-containing gas into the reactor, and allowing the hydrocarbon-rich gas and oxygen-containing gas to mix for a sufficient period of time to reduce the amount of tar in the hydrocarbon-rich gas. In an embodiment of the present invention, the method comprises reducing the amount of tar in a hydrocarbon-rich gas via oxidation. In an embodiment of the present invention, an oxygen-containing gas can partially oxidize the tar in a hydrocarbon-rich gas. In another embodiment of the present invention, an oxygen-containing gas can remove or destroy the tar in a hydrocarbon-rich gas. The method further comprises producing an oxidized product gas comprising less tar than tar-containing hydrocarbon-rich gas. In an embodiment of the present invention, the systems and methods of the present invention comprises removing or destroying substantially all of the tar in a hydrocarbon-rich gas. As used herein, the term "substantially all" refers to about 99.9900% of the tar in a hydrocarbon-rich gas. One of skill in the art would realize that the extent of tar removal from a hydrocarbon-rich gas would depend on at least the oxygen content of the oxygen-containing gas, the amount of tar in the hydrocarbon-rich gas, the temperatures of the gases, and/or the extent of mixing the gases, among others.

In various embodiments of the present invention, to maximize the effectiveness and efficiency of the process, the oxygen-containing gas (e.g., substantially pure oxygen) may be rapidly and/or thoroughly mixed in the reactor with the tar-containing hydrocarbon-rich gas. Given the high reactivity of the oxygen with the tar-containing hydrocarbon-rich gas, oxygen may be rapidly consumed. Therefore, rapid and thorough mixing of the oxygen-containing gas and the tar-containing hydrocarbon-rich gas allow a portion, a majority or more of the tar to access and react with the oxygen before the oxygen is consumed.

Reactors suitable for purposes of the present invention are well-known in the art. In various embodiments, methods of the present invention may utilize reactor systems that can create rapid mixing of the tar-containing hydrocarbon-rich gas with the oxygen-containing gas. These reaction systems can comprise various types of fluidized-beds, including, without limitation, conventional bubbling bed ("CBB") fluidized reactors, circulating fluid-bed ("CFB") reactors, and multi-solid fluid-bed ("MSFB") reactors, which enable rapid mixing of reactants and have high heat and mass transfer rates. In an embodiment of the present invention, the reactor can comprise a partial oxidation reactor.

In an embodiment of the present invention, the reactor can be a CBB reactor, which generally operates at gas velocities that are relatively small multiples of the minimum fluidization velocity, such as, without limitation, in the range of about 2 to about 5 ft/sec. CBB reactors have long been used in the chemical process industry, as well as in combustion applications, where the fluidized particles may be chemically active. For example, limestone and dolomite are widely used as the fluidized phase for CBB reactors to capture sulfur.

In another embodiment of the present invention, the reactor can be a CFB reactor, which generally operates at much higher gas velocities than a CBB reactor (e.g., without limitation, about 10 ft/sec to about 30 ft/sec or more), and is therefore more compact than a conventional fluid bed reactor. By operating at very high solids circulation rates, this type of reactor may be able to maintain high solids densities in the bed despite operating at velocities much higher than the elutriation velocities of the solids. In addition, the high solid circulation rates may eliminate bubble formation, often associated with CBB reactors, where bubbles form in the bed and rise up through the so-called emulsion phase. When the mass transfer rate between the bubbles and emulsion phase is lower than the oxidation rate, it is possible that some of the tar may escape oxidation.

In yet another embodiment, the reactor can be a MSFB reactor, such as, without limitation, the MSFB reactor disclosed in U.S. Pat. No. 4,154,581, which is herein incorporated by reference in its entirety. As compared to CFB reactors, MSFB reactors generally use a bed of much coarser particles (e.g., without limitation, ¼ inch dense ceramic spheres) that may create a higher solids density and a highly mixed turbulent zone at the base of the partial oxidation reactor. The rapid and thorough mixing created by the presence of the dense phase particles creates conditions suitable for the complete oxidation of tars in the tar-containing hydrocarbon-rich gas. In addition, because of the high gas velocities used, the MSFB may also be a compact reactor.

In various embodiments of the present invention, a solids circulation circuit of the reactor can comprise a cyclone for removing solids and a downcomer for returning and recycling the solids to the fluid bed. Solids rates may be controlled, such as, without limitation, by controlling the solids inventory in the system as well as by using mechanical and non-mechanical valves known in the art.

An aspect of the present invention comprises a method for removing tar from a gas, comprising: introducing a first gas into a reactor, the first gas comprising a tar; introducing a second gas into the reactor, the second gas comprising oxygen; and reacting the first gas with the second gas for time period sufficient to oxidize at least a portion of the tar of the first gas. In an embodiment of the present invention, the first gas can comprise many gases comprising tar, including but not limited to, a hydrocarbon-rich gas, such as synthesis gas.

The sufficient mixture of oxygen with the tar-containing hydrocarbon-rich gases may play a role in the minimization of the presence of tar in the product gas before the oxygen provided to the reactor is consumed. Under some circumstances, for example, the reaction rate of the oxygen with tar-containing hydrocarbon-rich gas can be controlled by regulating the configuration and performance of the reactor to allow the mixing rates to be equal to or higher than the reaction rate of the tar-containing hydrocarbon-rich gas with oxygen. In one embodiment, a plurality of injection ports for the oxygen-containing gas can be employed in the reactor to increase mixing rates of oxygen with tar-containing gas. As used herein, the term "plurality" means more than one. The number and configuration of these ports may depend on a number of factors, such as, the type of fluid bed employed and its size, which can be determined by a person skilled of ordinary skill in the art without the need for undue experimentation. For example, cold model testing may be used to establish the optimum configuration of these ports as well as injection velocities and other operational parameters.

In an embodiment of the present invention, the tar-containing hydrocarbon-rich gas can be heated or cooled prior to injection into the reactor (e.g., cooling a tar-containing hydrocarbon-rich gas to a predetermined temperature). In one embodiment of the present invention, the tar-containing hydrocarbon-rich gas can be a pre-heated gas, such as the product gas from biomass gasification. In an exemplary embodiment of the present invention, the temperature of the tar-containing hydrocarbon-rich gas can be cooled to a level where the rate of oxidation may be reduced to a point where complete or substantially complete mixing of the oxygen-containing gas and the tar-containing hydrocarbon-rich gas may be achieved before the oxygen is consumed. In the examples shown in Tables 1, 2, and 3, hot product gases with a temperature of about 1200° F. to about 1300° F. were mixed with oxygen having a temperature of about 60° F. Temperature increases from oxidation were on the order of about 300° F. to about 600° F. depending on the amount of oxygen injected into the reactor. The product gas can be cooled from about 1200° F. to about 800° F. without any tar condensation, which indicates that there is considerable flexibility in using gas cooling to control oxidation rates.

In another embodiment of the present invention, the oxygen-containing gas can be diluted with steam or another gas to reduce the rate of oxidation to a level where complete or substantially complete mixing of oxygen-containing gas and tar-containing hydrocarbon-rich gas may be achieved before the oxygen is consumed.

In an embodiment of the present invention, the tar-containing hydrocarbon-rich gas can be pre-heated or pre-cooled to a predetermined temperature suitable for tar reduction or destruction before introducing the gas into the reactor. In another embodiment of the present invention, the tar-containing hydrocarbon-rich gas, such as the product gas from a biomass gasification process, can be pre-cleaned prior providing the gas to the reactor to separate the char and/or sand from the gasifier product gas.

In addition, embodiments of the present invention provide a method for producing synthesis gas, which comprises introducing a tar-containing hydrocarbon-rich gas into a reactor, introducing an oxygen-containing gas into the reactor, and allowing the hydrocarbon-rich gas and the oxygen-containing gas to mix for a sufficient period of time to reduce the amount of tar in the tar-containing hydrocarbon gas. The synthesis gas produced therewith may comprise a variety of desirable features, including, without limitation, improved $H_2$/CO ratio, reduced or minimized contamination (e.g., tars, hydrogen sulfide, or other sulfur-based contaminants), and/or improved heat value (as measure in Btu/Scf).

Although the exemplary embodiments of the present invention are directed towards systems and methods of biomass gasification, one of ordinary skill in the art would realize that the systems and methods of the present invention are applicable to many gasification processes for the conversion of many carbonaceous materials, including but not limited to the gasification of coal, petroleum, natural gas, alcohols, and other hydrocarbon-containing materials.

As used herein and in the appended claims, the singular forms "a," "an," and "the" include plural references, unless the content clearly dictates otherwise. Thus, for example, reference to "a hydrocarbon-rich gas" includes a plurality of such hydrocarbon-rich gases and equivalents thereof known to those skilled in the art, and reference to "the gas" is a reference to one or more such gases and equivalents thereof known to those skilled in the art, and so forth. All publications, patent applications, patents, and other references mentioned herein are incorporated by reference in their entirety.

It should be understood, of course, that the foregoing relates only to exemplary embodiments of the present invention and that numerous modifications or alterations may be made therein without departing from the spirit and the scope of the invention as set forth in this disclosure.

Although the exemplary embodiments of the present invention are provided herein, the present invention is not limited to these embodiments. There are numerous modifications or alterations that may suggest themselves to those skilled in the art.

The present invention is further illustrated by way of the examples contained herein, which are provided for clarity of understanding. The exemplary embodiments should not be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Therefore, while embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

EXAMPLES

Example 1

Partial Oxidation of a Product Gas.

A number of simulations have been performed based on equilibrium calculations to examine the ability of the systems and methods of the present invention to achieve the high levels of tar destruction required for many applications. The results are summarized in Tables 1-3. Because of the very high rates of reaction and the high temperatures involved, it is expected that chemical equilibrium will be achieved. Another issue for successful tar destruction, the rapid and thorough mixing of injected $O_2$ with the product gas, will be achieved by the means summarized, supra, including a more fluid dynamic modeling. Establishing a desirable fluid dynamic modeling for a particular facility may be achieved using techniques known in the art.

Table 1 shows the results of a representative equilibrium calculation using the tar constituents in a typical Silva Gas product gas, which is produced in the Silva Gas Gasification Plant in Burlington, Vt., with both gasification and combustion being carried out in circulating fluidized beds operating at very high solids fluxes (30,000 to 60,000 lbs/sq-ft/sec). The gas to the partial oxidation unit enters at a temperature of about 1207° F. As shown in Table 1, constituents from benzene on down the list are referred to as tars. Gas exits the partial oxidizer at about 1827° F. having destroyed a substantial amount of tar.

TABLE 1

Partial Oxidation of the Product Gas from a Nominal 800 TPD Silva Gas Gasification Plant

| | Properties | | | |
|---|---|---|---|---|
| | Overall | Vapor | Liquid | Solid |
| To partial oxidation unit | | | | |
| Temperature (° F.) | 1206.792 | | | |
| Pressure psia | 14.696 | | | |
| Std sp. gr. * air = 1 | 0.759 | | | |
| Molar flow lbmol/h | 4138.620 | 4138.620 | 0.000 | 0.000 |
| Mass flow lb/h | 90928.703 | 90928.703 | 0.000 | 0.000 |
| Avg. mol. wt. | 21.971 | 21.971 | 0.000 | 0.000 |
| Actual dens lb/ft3 | 0.018 | 0.018 | 0.000 | 0.000 |
| Flowrates in lbmol/h | | | | |
| Oxygen | 358.4590 | 358.4590 | 0.0000 | 0.0000 |
| Hydrogen | 458.2348 | 458.2348 | 0.0000 | 0.0000 |
| Carbon Dioxide | 244.1404 | 244.1404 | 0.0000 | 0.0000 |
| Carbon Monoxide | 1014.1410 | 1014.1410 | 0.0000 | 0.0000 |
| Methane | 345.5455 | 345.5455 | 0.0000 | 0.0000 |
| Ethylene | 116.4351 | 116.4351 | 0.0000 | 0.0000 |
| Ethane | 15.0238 | 15.0238 | 0.0000 | 0.0000 |
| Nitrogen | 15.0238 | 15.0238 | 0.0000 | 0.0000 |
| Water | 1555.0109 | 1555.0109 | 0.0000 | 0.0000 |
| Hydrogen Sulfide | 2.0559 | 2.0559 | 0.0000 | 0.0000 |
| Ammonia | 0.0185 | 0.0185 | 0.0000 | 0.0000 |
| Benzene | 0.5933 | 0.5933 | 0.0000 | 0.0000 |
| Toluene | 0.6718 | 0.6718 | 0.0000 | 0.0000 |
| Ethylbenzene | 0.0785 | 0.0785 | 0.0000 | 0.0000 |
| O-Xylene | 0.0562 | 0.0562 | 0.0000 | 0.0000 |
| M-Xylene | 0.0562 | 0.0562 | 0.0000 | 0.0000 |
| P-Xylene | 0.0562 | 0.0562 | 0.0000 | 0.0000 |
| Styrene | 1.0382 | 1.0382 | 0.0000 | 0.0000 |
| 1,3,5-Trimethylb | 0.0116 | 0.0116 | 0.0000 | 0.0000 |
| Phenol | 5.3220 | 5.3220 | 0.0000 | 0.0000 |
| 1,2,4-Trimethylb | 0.0349 | 0.0349 | 0.0000 | 0.0000 |
| O-Cresol | 0.8347 | 0.8347 | 0.0000 | 0.0000 |
| M-Cresol | 0.6805 | 0.6805 | 0.0000 | 0.0000 |
| P-Cresol | 0.6805 | 0.6805 | 0.0000 | 0.0000 |
| Naphthalene | 2.9082 | 2.9082 | 0.0000 | 0.0000 |
| Acenaphthene | 0.6514 | 0.6514 | 0.0000 | 0.0000 |
| Fluorene | 0.1777 | 0.1777 | 0.0000 | 0.0000 |
| Phenanthrene | 0.3054 | 0.3054 | 0.0000 | 0.0000 |
| Anthracene | 0.1353 | 0.1353 | 0.0000 | 0.0000 |
| Fluoranthene | 0.0872 | 0.0872 | 0.0000 | 0.0000 |
| Pyrene | 0.1149 | 0.1149 | 0.0000 | 0.0000 |
| Benzanthracene | 0.0349 | 0.0349 | 0.0000 | 0.0000 |
| Chrysene | 0.0031 | 0.0031 | 0.0000 | 0.0000 |
| Nitric Oxide | 0.0000 | 0.0000 | 0.0000 | 0.0000 |
| Nitrogen Dioxide | 0.0000 | 0.0000 | 0.0000 | 0.0000 |
| Sulfur Dioxide | 0.0000 | 0.0000 | 0.0000 | 0.0000 |
| Exit oxidation unit | | | | |
| Temperature (° F.) | 1826.532 | 1826.532 | 0.000 | 0.000 |
| Pressure psia | 14.696 | 14.696 | 0.000 | 0.000 |
| Std sp. gr. * air = 1 | 0.623 | 0.623 | 0.000 | 0.000 |
| Molar flow lbmol/h | 5036.024 | 5036.024 | 0.000 | 0.000 |
| Mass flow lb/h | 90931.039 | 90931.039 | 0.000 | 0.000 |
| Avg. mol. wt. | 18.056 | 18.056 | 0.000 | 0.000 |
| Actual dens lb/ft3 | 0.011 | 0.011 | 0.000 | 0.000 |
| Flowrates in lbmol/h | | | | |
| Oxygen | 0.000 | 0.000 | 0.0000 | 0.0000 |
| Hydrogen | 1806.3513 | 1806.3513 | 0.0000 | 0.0000 |
| Carbon Dioxide | 569.3259 | 569.3259 | 0.0000 | 0.0000 |
| Carbon Monoxide | 1413.1492 | 1413.1492 | 0.0000 | 0.0000 |
| Methane | 0.0337 | 0.0337 | 0.0000 | 0.0000 |
| Ethylene | 0.0000 | 0.0000 | 0.0000 | 0.0000 |
| Ethane | 0.0000 | 0.0000 | 0.0000 | 0.0000 |
| Nitrogen | 15.0285 | 15.0285 | 0.0000 | 0.0000 |
| Water | 1230.0728 | 1230.0728 | 0.0000 | 0.0000 |
| Hydrogen Sulfide | 2.0548 | 2.0548 | 0.0000 | 0.0000 |
| Ammonia | 0.0085 | 0.0085 | 0.0000 | 0.0000 |
| Benzene | 0.0000 | 0.0000 | 0.0000 | 0.0000 |
| Toluene | 0.0000 | 0.0000 | 0.0000 | 0.0000 |
| Ethylbenzene | 0.0000 | 0.0000 | 0.0000 | 0.0000 |
| O-Xylene | 0.0000 | 0.0000 | 0.0000 | 0.0000 |

TABLE 1-continued

Partial Oxidation of the Product Gas from a
Nominal 800 TPD Silva Gas Gasification Plant

| | Properties | | | |
|---|---|---|---|---|
| | Overall | Vapor | Liquid | Solid |
| M-Xylene | 0.0000 | 0.0000 | 0.0000 | 0.0000 |
| P-Xylene | 0.0000 | 0.0000 | 0.0000 | 0.0000 |
| Styrene | 0.0000 | 0.0000 | 0.0000 | 0.0000 |
| 1,3,5-Trimethylb | 0.0000 | 0.0000 | 0.0000 | 0.0000 |
| Phenol | 0.0000 | 0.0000 | 0.0000 | 0.0000 |
| 1,2,4-Trimethylb | 0.0000 | 0.0000 | 0.0000 | 0.0000 |
| O-Cresol | 0.0000 | 0.0000 | 0.0000 | 0.0000 |
| M-Cresol | 0.0000 | 0.0000 | 0.0000 | 0.0000 |
| P-Cresol | 0.0000 | 0.0000 | 0.0000 | 0.0000 |
| Naphthalene | 0.0000 | 0.0000 | 0.0000 | 0.0000 |
| Acenaphthene | 0.0000 | 0.0000 | 0.0000 | 0.0000 |
| Fluorene | 0.0000 | 0.0000 | 0.0000 | 0.0000 |
| Phenanthrene | 0.0000 | 0.0000 | 0.0000 | 0.0000 |
| Anthracene | 0.0000 | 0.0000 | 0.0000 | 0.0000 |
| Fluoranthene | 0.0000 | 0.0000 | 0.0000 | 0.0000 |
| Pyrene | 0.0000 | 0.0000 | 0.0000 | 0.0000 |
| Benzanthracene | 0.0000 | 0.0000 | 0.0000 | 0.0000 |
| Chrysene | 0.0000 | 0.0000 | 0.0000 | 0.0000 |
| Nitric Oxide | 0.0000 | 0.0000 | 0.0000 | 0.0000 |
| Nitrogen Dioxide | 0.0000 | 0.0000 | 0.0000 | 0.0000 |
| Sulfur Dioxide | 0.0001 | 0.0001 | 0.0000 | 0.0000 |

In addition to the at least partial destruction of tars and elimination of hydrocarbon gases (except for a trace of methane), the $H_2/CO$ ratio is significantly improved—from 0.45 for the input product gas to 1.3 for the output gas from the partial oxidation reactor (i.e., the tar destruction reactor), which makes it more suitable for the production of synthesis gas. Sulfur in the output gas will remain as $H_2S$ because of the highly reducing nature of the gas from the partial oxidation reactor and thereby will be able to be captured using limestone or the like as the fluidizing media or in a separate sulfur guard unit. The destruction of tars, including phenols and cresols, will greatly simplify the down-stream water treatment process, which otherwise can be an expensive processing step. Also of great importance is that all these benefits are achieved with no loss of product gas total energy, which, in fact, actually has a small increase due to the endothermic reforming reactions driven by the high steam content of the product gas (see also, Table 3).

Example 2

Partial Oxidation of a Hydrocarbon-Rich Gas Containing Toluene.

Table 2 shows the results of a representative equilibrium calculation using gas mixtures containing only one tar species. A software program based on minimizing the Gibbs free energy was used to compute equilibrium compositions of reacting gas mixtures as well as the heat balance, assuming the system is adiabatic. The software enabled examination of factors, such as gas compositions, temperatures, oxygen consumption, and potential loss of energy in the product gas. Programs similar to the one used by the inventor are widely known in the art, for example as a component in the well known chemical design program ChemCad.

In the particular example, the only tar species in the input reacting gas mixture was toluene, which was used as a tar surrogate. The reactant gas composition was taken directly from the heat and material balance model at 25% moisture and default values for the other parameters. The gas composition was based on a proprietary heat and material balance model developed from a pilot plant as well as data from a commercial sized plant. The calculations were based on per pound of bone dry wood.

The software simulation showed that at every level of oxygen tested, the process achieved elimination of the tar surrogate as well as elimination of hydrocarbon gases by reforming and partial oxidation. The combustion energy of the partial oxidation products exceeded that of the gasifier product gas until a partial oxidation temperature of 1900° F., at which point they are about equal. While there was no loss of total combustion energy, the volume of moisture-free product gas was substantially higher after partial oxidation because of the reforming of the higher energy density hydrocarbons. For example, the untreated dry product gas has a higher heating value ("hhv") of about 470 Btu/scf and the oxidized product gas has a hhv of about 275 Btu/scf.

TABLE 2

Partial Oxidation of Hydrocarbon-Rich Gas Containing Toluene
Conditions
Adiabatic T and composition at constant P

| | No. moles | Mole fraction |
|---|---|---|
| Reactants | | |
| $C_2H_4$ | $1.9700 \times 10^{-03}$ | 0.02791 |
| $C_2H_6$ | $2.6000 \times 10^{-04}$ | $3.684 \times 10^{-03}$ |
| $CH_4$ | $5.9000 \times 10^{-03}$ | 0.08359 |
| CO | $1.7400 \times 10^{-02}$ | 0.24653 |
| $CO_2$ | $4.2000 \times 10^{-03}$ | 0.05951 |
| $H_2$ | $7.8000 \times 10^{-03}$ | 0.11051 |
| $H_2O$ | $2.6500 \times 10^{-02}$ | 0.37546 |
| Toluene | $3.0000 \times 10^{-04}$ | $4.250 \times 10^{-03}$ |
| $O_2$ | $6.2500 \times 10^{-03}$ | 0.08855 |
| Products | | |
| $C_2H_4$ | $2.1024 \times 10^{-13}$ | $2.442 \times 10^{-12}$ |
| $C_2H_6$ | $3.2447 \times 10^{-15}$ | $3.769 \times 10^{-14}$ |
| $CH_4$ | $2.5411 \times 10^{-07}$ | $2.952 \times 10^{-06}$ |
| CO | $2.4637 \times 10^{-02}$ | 0.28621 |
| $CO_2$ | $9.4227 \times 10^{-03}$ | 0.10946 |
| $H_2$ | $3.0702 \times 10^{-02}$ | 0.35667 |
| $H_2O$ | $2.1318 \times 10^{-02}$ | 0.24765 |
| Toluene | $2.4153 \times 10^{-37}$ | $2.806 \times 10^{-36}$ |
| $O_2$ | $5.2943 \times 10^{-16}$ | $6.150 \times 10^{-15}$ |
| Properties | Reactants | Products |
| Temperature (K) | 970 | 1315.6 |
| Pressure(atm) | 1 | 1 |
| Volume Ration | 1 | 1.654 |
| Moles Prod/React | 1.219602 | |

As further depicted in Table 3, the output gas leaving the partial oxidation unit has a significantly higher temperature than that of the input gas entering the reactor. The substantial increase in the product gas temperature allows increased recovery of sensible heat with no limitations due to tar condensation. In addition, embodiments of the present invention provide greater compression requirements—from about 1.7 to about 1.8 that of the scrubbed product gas. When dry wood is used as the materials for biomass gasification, oxygen requirements for destructing tars range from about 0.16 to about 0.2 tons of oxygen per ton of dry wood, adding only a limited amount to the cost of production.

TABLE 3

Summary of Partial Oxidation Results

| Oxygen | | | | | |
|---|---|---|---|---|---|
| lb moles/lb dry wood | 0.005 | 0.0055 | 0.00575 | 0.006 | 0.00625 |
| tons/ton dry wood | 0.16 | 0.176 | 0.184 | 0.192 | 0.2 |
| Partial Oxidation Temperature (° F.) | 1593 | 1719 | 1782 | 1846 | 1909 |
| HHV Oxidation Product Gas (Btu/scf) | 274 | 275 | 276 | 276 | 277 |
| Ratio of total combustion energy (oxidation product/scrubbed gas) | 1.05 | 1.035 | 1.03 | 1.02 | 1.01 |
| Partial Oxidation Gas Composition (vol % dry) | | | | | |
| CO | 34.3 | 35.9 | 36.7 | 37.3 | 38 |
| $CO_2$ | 15.5 | 15 | 14.8 | 14.7 | 14.5 |
| $H_2$ | 50.2 | 49.1 | 48.5 | 48 | 47.5 |
| Total | 100 | 100 | 100 | 100 | 100 |
| mole ratio partial ox gas/scrubbed gas (dry) | 1.82 | 1.78 | 1.77 | 1.75 | 1.73 |

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A biomass gasification system comprising:
    a combustor for heating a fluidized particulate material;
    a gasifier to heat a biomass feedstock with the heated fluidized particulate material, to produce a product gas comprising a tar; and
    a reactor to react an oxygen-containing gas with the product gas comprising a tar to at least partially oxidize the tar to produced an at least partially oxidized product gas.

2. The biomass gasification system of claim 1, wherein at least a portion of the biomass feedstock is converted to char in the gasifier and wherein the char is transferred out of the gasifier.

3. The biomass gasification system of claim 1, wherein at least a portion of the char is transferred to the combustor and combusted to heat the fluidized particulate material.

4. The biomass gasification system of claim 1, wherein the rate of heat transfer between the heated fluidized particulate material and the biomass feedstock is sufficient to convert at least about 70% of the carbon in the biomass feedstock into the product gas at a temperature of about 1200° F. to about 1500° F.

5. The biomass gasification system of claim 1, wherein the oxygen-containing gas is substantially pure oxygen.

6. The biomass gasification system of claim 1, wherein the reactor utilizes a fluidized medium to optimize the oxidation of the tar.

7. The biomass gasification system of claim 6, wherein the fluidized medium comprises one or more of calcined dolomite, limestone, olivine sand, and a calcium containing material.

8. The biomass gasification system of claim 1, wherein the product gas is cooled prior to the reactor.

9. The biomass gasification system of claim 1, wherein the oxidized product gas has a $H_2/CO$ ratio that is at least twice as large as the $H_2/CO$ ratio of the product gas comprising a tar.

10. A biomass gasification method, comprising:
    heating a fluidized particulate material in a combustor;
    transferring the heated fluidized particulate material to a gasifier;
    introducing a biomass feedstock to the gasifier, wherein heat from the fluidized particulate material causes the gasification of at least a portion of the biomass feedstock to form a tar-containing product gas; and
    introducing the tar-containing product gas and an oxygen-containing gas into a reactor, wherein the oxygen-containing gas reacts with the tar to oxidize at least a portion of the tar of the tar-containing gas to produce an at least partially oxidized product gas comprising less tar than the tar-containing product gas.

11. The biomass gasification method of claim 10, wherein at least a portion of the biomass feedstock is converted to char in the gasifier and wherein the char is transferred out of the gasifier.

12. The biomass gasification method of claim 10, wherein the oxygen-containing gas is substantially pure oxygen.

13. The biomass gasification method of claim 10, further comprising introducing a fluidized medium into the reactor.

14. The biomass gasification system of claim 10, further comprising cooling the tar-containing product gas before introducing the product gas into the reactor 15. The biomass gasification system of claim 10, wherein the oxidized product gas has a $H_2/CO$ ratio that is at least twice as large as the $H_2/CO$ ratio of the product gas comprising a tar.

* * * * *